May 26, 1953  J. P. JOHNSON  2,639,672
CONTROLLED PRESSURIZING OF PUMPS
Filed Nov. 15, 1947  2 Sheets-Sheet 1

INVENTOR.
JAMES P. JOHNSON
BY
Oberlin & Limbach
ATTORNEYS.

May 26, 1953 J. P. JOHNSON 2,639,672
CONTROLLED PRESSURIZING OF PUMPS
Filed Nov. 15, 1947 2 Sheets-Sheet 2
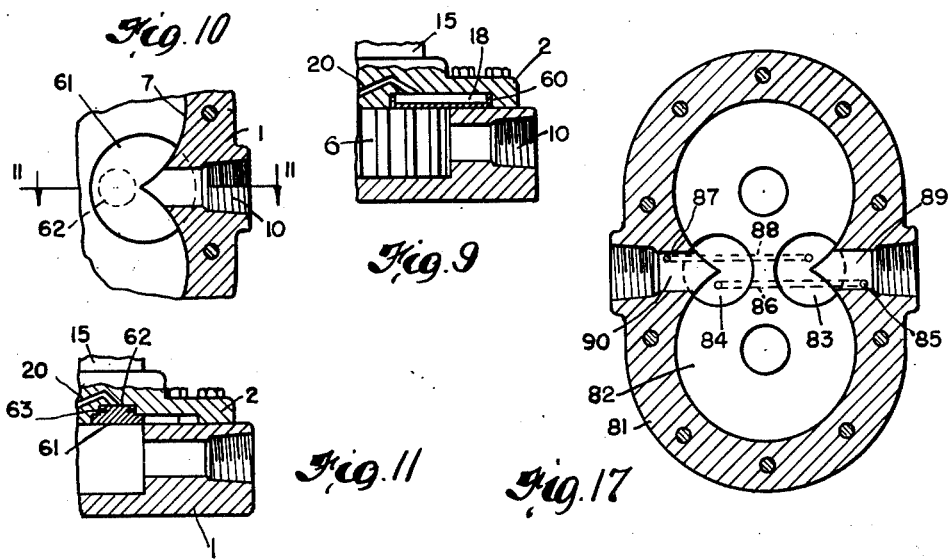
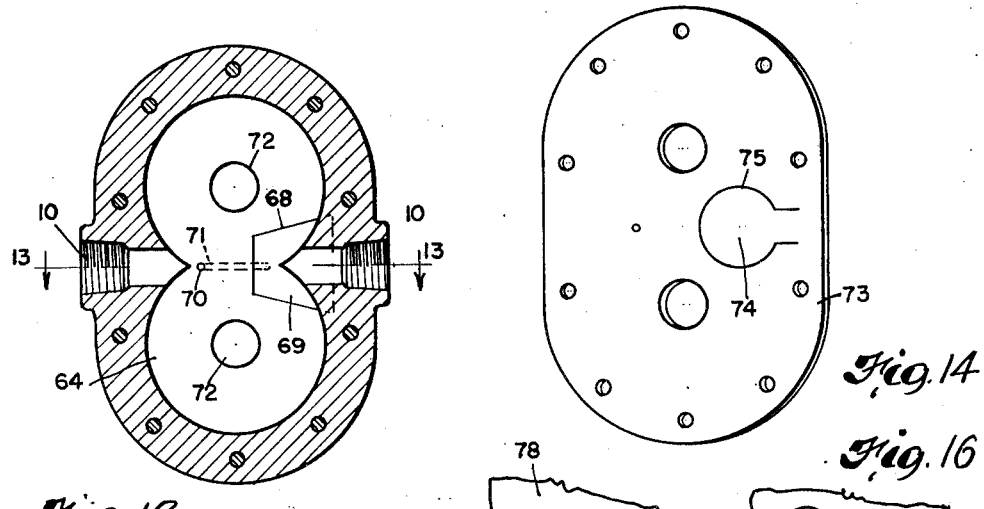
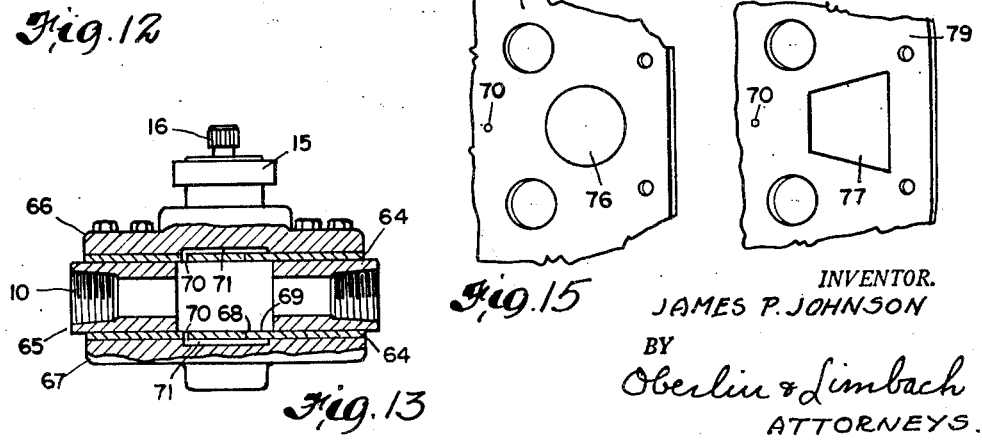
INVENTOR.
JAMES P. JOHNSON
BY
Oberlin & Limbach
ATTORNEYS.

Patented May 26, 1953

2,639,672

UNITED STATES PATENT OFFICE 2,639,672

CONTROLLED PRESSURIZING OF PUMPS

James P. Johnson, Shaker Heights, Ohio

Application November 15, 1947, Serial No. 786,215

7 Claims. (Cl. 103—126)

The present invention relates generally, as indicated, to pressurized pumps, and more particularly to certain improvements in such pumps whereby controlled pressurizing may be effected.

Pressurizing of pumps is, of course, known in the art and in the case of gear pumps, for example, one expedient is to provide a spring loaded member or members in the pump case operated upon by the pressure of the fluid delivered by the pump for taking up clearance along the side faces of the gears. Although such structure effectively reduces bypass of fluid from the pressure side to the intake side of the pump to a minimum to provide a high volumetric efficiency, it has the disadvantage that the forcing of said member or members against the side faces of the gears by fluid under pressure supplemented by the spring loading effectuates a correspondingly reduced mechanical efficiency as the pressure delivered by the pump increases, such reduction in mechanical efficiency being attributable to the increased friction along the side faces of the gears. In the usual form of such pressurized pump there is the further disadvantage that there is a loss in the volume of fluid delivered by the pump occasioned by leakage of fluid from the pressure area through said member or members into the intake area of the pump.

Accordingly it is one primary object of this invention to provide a pump which has means therein for effecting controlled pressurizing, viz., pressurizing controlled to a degree such that a high volumetric efficiency is retained at all times without objectionable reduction in mechanical efficiency.

Another object is to provide a pressurizing means of such form that it may readily be varied as desired.

Still another object is to provide a pressurizing means operable by a static condition of fluid under pressure whereby no loss in volume is occasioned by the incorporation of said means in a pump.

Still another object is to provide pressurizing means which does not require initial spring loading in order to effectuate its desired function.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 9 is a fragmentary cross section view similar to Fig. 2 except illustrating a slightly modified structure;

Figure 1:
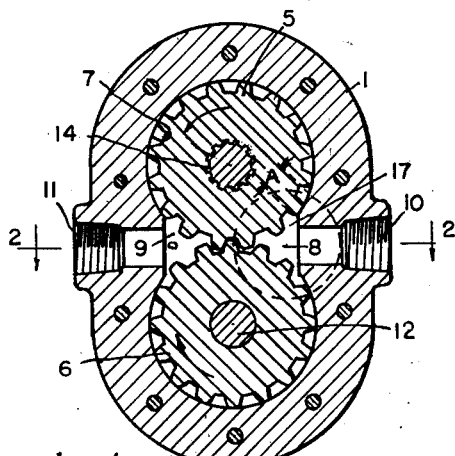
Fig. 1 is a cross section view through the case and gears of a gear pump incorporating my invention, such view having been taken along a plane parallel to the sides of the gears.
Figure 2:
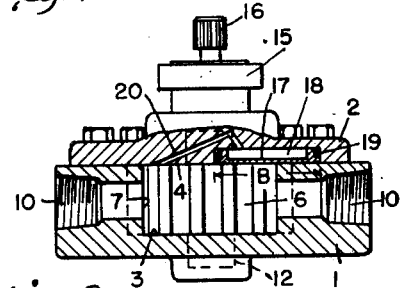
Fig. 2 is a cross section view of the pump illustrated in Fig. 1 taken substantially along the line 2—2 thereof.

Figs. 10 and 11 are fragmentary cross section views similar to Figs. 1 and 2 respectively, except with the gears omitted, and illustrating another form of the invention, Fig. 11 being a cross section view taken substantially along the line 11—11, Fig. 10.

Figs. 12 and 13 are cross section views similar to Figs. 1 and 2 respectively, except with the gears omitted and illustrating the invention as applied to a pump incorporating wear plates adjacent the sides of the gears, Fig. 13 being a cross section view taken substantially along the line 13—13, Fig. 12;

Fig. 14 is a perspective view of a wear plate similar to those illustrated in Figs. 12 and 13;

Figs. 15 and 16 are fragmentary perspective views illustrating modified forms of wear plates; and Fig. 17 is a cross section view illustrating a pump similar to that of Fig. 1 except with the gears omitted and disclosing pressurizing means associated with both the intake and discharge sides of the pump.

Referring now to the drawing and first to Figs. 1 and 2, the pump illustrated is a conventional gear pump comprising case parts 1 and 2 which define between them a pump cavity including parallel flat walls 3 and 4 having a close running fit with the sides of the gears 5 and 6 therein, and a peripheral wall 7 having a close running fit with a major portion of the outer peripheries of said gears. Such cavity forms with said gears intake and pressure chambers 8 and 9 respectively communicating with the passages 10 and 11 through said case part 1. The gears 5 and 6 may each be rotatably supported in the case as by stub shafts 12 and 14 projecting axially therefrom into suitable sockets formed in the case parts 1 and 2, the gear 5 being adapted to be driven by the shaft 14 which is splined and extends from an adaptor 15 into a splined opening in said gear. Within adaptor 15 said shaft 14 is non-rotatably coupled by means (not shown) to a drive shaft 16. The pump structure thus far described is to be regarded as merely illustrative, parts such as liners, bushings, shaft seals, bearings, and the like commonly employed in gear pumps having been omitted as not constituting critical parts of the present invention.

The crux of the present invention lies in the provision of a disk element 17 preferably associated with the intake chamber 8 of the pump and disposed in a cylindrical recess 18 in case part 2, one side of said element being closely adjacent to a portion of the side faces of gears 5 and 6 and a portion of the case 1. The overlap "A" of said disk element along the wall 7 is at least equal to the pitch of the teeth on the gears 5 and 6 for a reason which will appear in the ensuing description.

Disposed in a groove about said disk element is a sealing ring 19 preferably of rubber or rubber-like material making sealed engagement with the cylindrical wall of such recess 18 and with said disk element. In order that the disk element be always quite close to the sides of the gears without necessitating employment of spring means even when the pump is not operating or is operating at low pressure, the recess is of a depth only about .001–.003" greater than the thickness of said disk element.

Leading to the recess 18 from the pressure chamber 9 is a passage 20 whereby when the pump is in operation fluid under pressure will act on said disk element on an area of diameter "B" tending to urge the same in a direction toward the sides of the gears. Such action of the fluid under pressure on the disk element is obtained without loss of volume by reason of the provision of the sealing ring 19. When the fluid under pressure acts on the disk element as aforesaid it will be observed that by reason of the engagement of a portion of said element with case part 1, the remaining portion thereof will be prevented from being freely forced directly into tight metal-to-metal engagement with the sides of the gears. The disk element will, of course, yield and thereby move closer to the sides of the gears to effect an increase in or retention of a high volumetric efficiency of the pump but this yielding movement is not effective to undesirably reduce the mechanical efficiency as would occur in a pump in which a pressurizing member is not so constrained from movement. To render the disk element 17 more readily yieldable it may be made relatively thin, as shown. In addition to the yielding of the disk element there is a small amount of yielding of the case part 1, the yielding of either or both being controlled by proper dimensioning to produce the desired closing up of the side clearances without objectionable reduction in mechanical efficiency. To this end, the diameter "B" may also be modified in accordance with the pressures to be delivered by the pump in question.

When the side clearance is reduced as aforesaid, the amount of bypass or leakage of fluid from the pressure side to the suction side is reduced to a minimum but yet the attainment of a high volumetric efficiency is not obtained at the expense of a reduction in mechanical efficiency. It is to be understood that under ordinary operating conditions of the pump it may be desirable to either substantially close up such side clearance or as a matter of fact provide for light engagement of the disk element with the gears. In any case it is apparent that all avenues of leakage except, of course, the running fit clearances at the peripheries of the gears, will be sufficiently closed off by the disk element 17 to retain a high volumetric efficiency. I have found that because of the relatively great number of teeth on the gears and the fact that the teeth move rapidly along and close to the wall 7, the major portion of the bypass occurs along the side faces of the gears and it is this bypass which I eliminate without causing a material binding effect of the free rotation of the gears.

Figure 5:
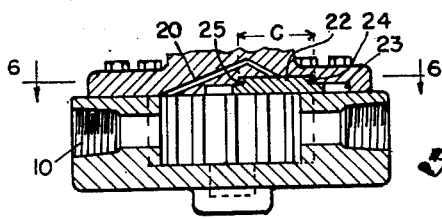
Fig. 5 is a cross section view of a pump similar to that of Figs. 1 and 2 except including a modified form of pressurizing means therein.
Figure 6:
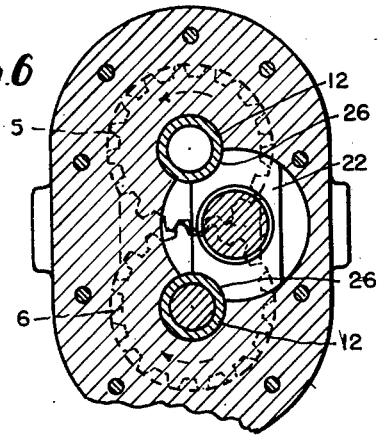
Fig. 6 is a cross section view of a pump similar to that of Figs. 1 and 2 taken along the line 6—6, Fig. 5.

Insofar as the pump structure of Figs. 5 and 6 is the same as that of Figs. 1 and 2, the description thereof need not be repeated. In Figs. 5 and 6 is illustrated a modified form of disk element 22 fitted into a case part formed with a recess consisting of large and small diameter portions 23 and 24 into which are respectively fitted the body and flange portions of said disk element, said body portion having a sealing ring 25 thereabout providing a pressure area of diameter "C" against which fluid under pressure is operative (through passage 20) to tend to force said disk element toward the sides of the gears. As best shown in Fig. 6, it may be necessary in some instances to form the flange portion of said disk element to other than circular form to provide desired area relations thereof adjacent the gears and case part and to provide notches or cutouts 26, for example, to partly embrace the stub shafts 12 of the gears.

Figure 3:
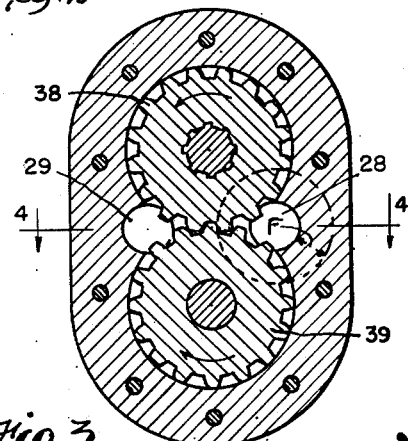
Fig. 3 is a cross section like that of Fig. 1 except illustrating a different form of gear pump.
Figure 4:
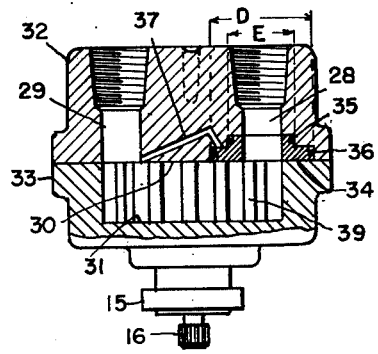
Fig. 4 is a cross section view of the pump illustrated in Fig. 3 taken substantially along the line 4—4 thereof.

The gear pump structure of Figs. 3 and 4 is so closely similar to that of Figs. 1 and 2 as to require only pointing out of the distinguishing features, one of which is that the axes of the intake and discharge passages 28 and 29 lie in planes normal to the flat parallel faces 30 and 31 of the pump cavity defined between the case parts 32 and 33. To accommodate the annular disk element 34 which preferably comprises concentric body and flange portions each respectively carrying a sealing ring 35 and 36, the intake passage 28 is formed with two counterbores respectively receiving such body and flange portions. With a disk element as illustrated, fluid under pressure through a passage 37 leading from the pressure chamber 29 to the upper surface of the flange portion of said disk element is operative on the annular pressure area of diameter D minus diameter E tending to urge said element toward the gears 38 and 39 rotatably supported in the case of the pump. Here again, as in the previously described disk elements, such movement is constrained by the engagement of a portion of the disk element with one of the case parts whereby controlled pressurizing by yielding or otherwise is effected through proper dimensioning of the disk element and the areas thereof disposed adjacent the sides of the gears and case part. The radial width "F" of the element 34 is preferably at least equal to the pitch of the teeth of gears 38 and 39 whereby to preclude bypass along the sides of the teeth.

It will be apparent that, although each of the disk elements 17, 22, and 34 thus far described has been illustrated in association with the intake side of a pump, said disk elements may equally as well be installed in the pressure side of a pump so long as the pressure area tending to urge the disk element toward the sides of the gears is greater than that tending to urge the disk element away from the sides of the gear. It will be observed that if portions of the disk element are initially closely adjacent to the sides of the gears and one of the case parts such desired pressure area relation is more or less automatically attained. However, it will be seen that the yielding of the disk element will occur in a somewhat different manner inasmuch as in one case portions on one side will be subjected to the same unit pressure as other portions on the opposite side, and in the other case, portions on one side will be subjected to pressure and other portions on the opposite side will be subjected to a negative or suction pressure. Other expedients for carrying out the desired objects of this invention are to utilize more than one disk element, as for example a pair of disk elements each disposed on opposite sides of the gears.

Figure 7:
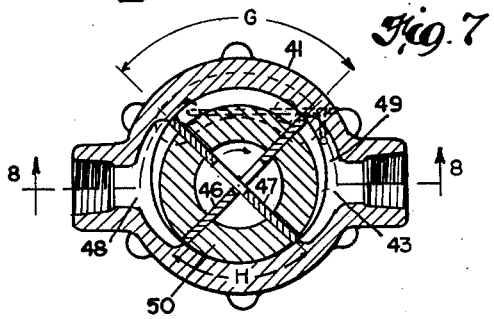
Fig. 7 is a cross section view through the case and rotor of a vane pump taken along a plane parallel to the end faces of the rotor.
Figure 8:
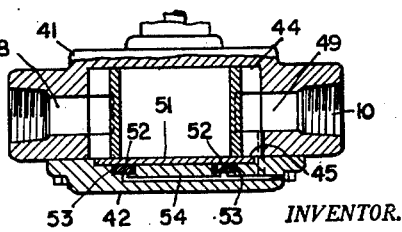
Fig. 8 is a cross section view taken along line 8—8, Fig. 7.

The vane pump structure of Figs. 7 and 8 is illustrative of the application of the principles of my invention thereto. Such vane pump is shown as comprising case parts 41 and 42 defining between them a pump cavity which includes a bore 43 of non-circular cross section and parallel end walls 44 and 45. Within such cavity is a cylindrical rotor 50 mounted in the case for rotation about an axis eccentric of that of the pump cavity and having a close running fit with one side of such bore 43 and with such walls 44 and 45. Mounted in said rotor for radial sliding movement are a plurality of vanes 46 and 47 having their ends continuously closely adjacent the wall of bore 43 and the walls 44 and 45 during rotation of said rotor. Leading into the pump cavity from opposite sides of the point where the rotor has a running fit with bore 43 are intake and pressure passages 48 and 49. The operation of the pump illustrated is so well known that description thereof is deemed unnecessary and while but one typical form is disclosed it is to be understood that other forms may be equally well suited for use in conjunction with the controlled pressurizing means constituting the present invention. In the vane pump disclosed a considerably portion of the bypass normally encountered occurs along the sides of the outer portions of the vanes while traversing through the zone designated "G" in Fig. 7. The radial width of the rotor is sufficient to render bypass along the ends thereof negligible and likewise the area "H" wherein the rotor has a running fit with bore 43 is sufficiently large to preclude objectionable bypass.

To minimize such bypass along the sides of the outer portions of the vanes there is provided a disk element 51 fitted into a recess in the case part 42, said element being of arcuate curved form having a face with portions thereof closely adjacent one end of the rotor 50 and case part 41 and the sides of the vanes 46 and 47 as they pass through the annular space "G" between the wall of bore 43 and the outer cylindrical surface of rotor 50. Associated with and bearing on said disk element are one or more cylindrical disks 52 which extend into correspondingly shaped recesses in case part 42, said disks being preferably sealed in such recesses by the sealing rings 53 thereabout. Leading to such recesses from the pressure side of the pump is a passage 54 whereby during operation of the pump, the pressure of the fluid delivered by the pump is operative on the areas of the disks 52 to tend to urge the disk element 51 toward the sides of the vanes 46 and 47. Such movement of the disk element is constrained by the engagement thereof with the case part 41 whereby said disk element will yield as previously described to reduce the side clearances along the ends of the rotor 50 and the sides of the vanes 46 and 47 but without objectionable increase in friction.

In the modification illustrated in Fig. 9 the disk element 60 is like that of Fig. 2, that is, disk element 18, except that the sealing ring 19 has been omitted, said disk element 60 being illustrated as a cup-shaped stamping or the like, having a sufficiently close sliding fit in the recess 18 to thus preclude objectionable leakage of fluid from the discharge side of the pump through passage 20 and around said disk element to the intake side of the pump. It is to be understood that in any of the other disk elements described the sealing rings may likewise be omitted provided that the fit between said disk elements and their respective recesses is sufficiently close to substantially effect the seal.

In the pump structure of Figs. 10 and 11, the disk element 61 is substantially heart-shaped and is not constrained from movement against the side faces of the gears, said gears having been omitted for sake of clarity. As illustrated, said disk element 61 is cut away to fit fairly closely to the peripheral wall 7 of case part 1 and has a small cylindrical projection 62 thereon fitted into a correspondingly shaped recess in the case part 2, a passage 20 leading to such recess from the pressure side of the pump, as in Fig. 2 for example. Such projection 62 is shown with a sealing ring 63 thereabout but, as explained above, said ring may be omitted if desired provided that the projection 62 has a fairly close slip fit in its recess. It will now be apparent that even though the disk element 61 is not constrained from bodily movement against the sides of the gears by fluid under pressure acting on the area of the projection 62, there will not be an objectionable increase in the friction between the gears and said disk element inasmuch as the area acted upon by fluid under pressure is relatively small. Such area, of course, may be modified between zero and a predetermined maximum simply by varying the diameter of projection 62 and of the recess into which it fits.

In pumps of the type disclosed in Figs. 12 and 13 employing wear plates 64 of bronze or like bearing material disposed closely adjacent the opposite side faces of the gears (omitted for clarity), I have found it desirable to shear through each of said plates along a line 68 whereby to provide a portion 69 on each plate which may yield relative to the remaining portions of each plate and be urged by fluid under pressure toward the side faces of the gears to thus effect controlled pressurizing. As best shown in Fig. 13, said plates 64 are disposed on opposite sides of the case part 65 and are clamped thereto as by the cover plates 66 and 67. Access of fluid under pressure to such portions 69 is preferably through an opening 70 in each plate and a channel 71 formed in the cover plates 66 and 67, such opening 70 communicating with the pressure side of the pump. The wear plates 64 are also preferably formed with openings 72 therethrough for receiving the stub shafts of the gears if such are provided.

It can be seen that inasmuch as the portions 69 are integral with the plates 64 and are sheared therefrom the fit between them is sufficiently close to preclude objectionable by-pass of fluid from the pressure side to the intake side of the pump even without employing gaskets or the like along the lines 68. The portions 69, as shown in Figs. 12 and 13 are partially constrained from movement by the case part 65 but it may be desirable in some instances to have the portions 69 disposed wholly adjacent the side faces of the gears.

The wear plate 73 illustrated in Fig. 14 is similar to that of Figs. 12 and 13 with the exception that the integrally connecting yielding portion 74 thereof is of a slightly different contour, as indicated by the line 75, such contour being selected in accordance with the relative areas of the side faces of the gears to be covered by the portion 74.

Figs. 15 and 16 are illustrative of wear plates in which the movable portions 76 and 77 are completely severed from the remaining portions of the plates 78 and 79 respectively, whereby such severed portions comprise separate disk elements corresponding to those described above in relation to the other figures of the drawings. However, it is to be noted that the close fit of the portions 76 and 77 in the openings in the respective plates is automatically obtained by the shearing of such portions from the wear plates. With the wear plates 78 or 79 installed in a pump such as that illustrated in Fig. 13 fluid under pressure having communication with said disk elements 76 and 77 as by the opening 70 and channel 71 will urge said disk elements closer toward the side faces of the gears whereby to maintain a high volumetric efficiency of the pump. In this case the disk elements 76 and 77 may or may not abut the case part 65.

Although the above-described wear plates have been particularly described in relation to gear pumps, it will be apparent to those skilled in the art that said wear plates may in some instances be installed in other types of pumps as, for example, the vane-type pump illustrated in Figs. 7 and 8.

In Fig. 17 is illustrated a gear pump structure (gears omitted) in which case parts 81 and 82 correspond generally with case parts 1 and 2 respectively, as shown in Figs. 1 and 2, except that two disk elements 83 and 84 are provided, said disk elements being similar to any of those described above. Leading to the areas behind said disk elements are the passages 85, 86 and 87, 88, in the case parts 81 and 82, such passages permitting access of fluid under pressure delivered by the pump to one of said disk elements regardless of which of the ports 89 and 90 are discharge and intake ports. Thus the gears may be optionally rotated in either direction and in either event one of the disk elements will perform its pressurizing function. Instead of having both disk elements on the same side of each of the gears, as shown, one may be on one side of the gears and the other on the opposite side or, if desired, four disk elements may be provided, one pair being disposed on each side of the gears. In the embodiment of the invention illustrated in Figs. 12 and 13, for example, one of the wear plates 64 may be turned over whereby the flap 69 thereon will be associated with one side of the pump while the flap 69 on the other of said wear plates will be associated with the other side of the pump. Thus here again the gears may be rotated in opposite directions and in either event the intake side of the pump will be pressurized as aforesaid.

In summary, it will be now apparent that I have provided controlled pressurizing means for pumps which minimizes by-pass of fluid from the pressure side to the intake side to thus establish a high volumetric efficiency but without objectionable reduction in mechanical efficiency and which is operative without effecting a loss of volume. The disk elements herein disclosed are preferably made from a bearing metal such as bronze but obviously other metals are suitable as well as non-metallic substances including thermosetting and thermoplastic plastics.

Other modes of applying the principle of the invention may be employed, change being made as regards the details described, provided the features stated in any of the following claims, or the equivalent of such, be employed.

I therefore particularly point out and distinctly claim as my invention:

1. The combination with a gear pump comprising a case with a cavity therein and intake and discharge passages leading into such cavity, and a pair of meshing gears rotatably supported in said case and having a running fit with the walls of such cavity whereby the draw fluid into such intake passage and deliver such fluid under pressure into such discharge passage, of a disk element in said case with a portion one of its sides constituting a portion of one of the walls of such cavity closely adjacent one of the sides of said gears and teeth thereof and extending continuously across the point of gear intermesh and along such one side of said gears to the inner peripheral wall of the cavity to close communication between such passages thereat with its other side exposed to fluid under pressure delivered by the pump, said case being formed with a passage leading from such discharge passage to such other side of said element, and means in said case abutting another portion of such first-named side of said element thereby contraining bodily movement of said element by fluid under pressure acting thereon in a direction closer toward such one side of said gears, said element being yieldable whereby the portion thereof unconstrained by said means is yieldably urged toward such one side of said gears and teeth thereof.

2. The pump structure according to claim 1 further characterized in that a portion of such first-named side of said element is in communication with such intake passage.

3. The pump structure according to claim 1 further characterized in that there is a wear plate in said case having one face thereof constituting one of the walls of such cavity, said disc element being carried by said wear plate.

4. The pump structure according to claim 1 further characterized in that there is a wear plate in said case having one face thereof constituting one of the walls of such cavity, said wear plate being sheared therethrough to thus form said disc element which is integrally connected to said wear plate.

5. The pump structure according to claim 1 further characterized in that there is a wear plate in said case having one face thereof constituting one of the walls of such cavity, said wear plate being sheared therethrough to thus form said disc element which is closely fitted into the opening form which sheared.

6. The combination with a gear pump comprising a case formed with a cavity therein and intake and discharge passages leading into such cavity, and a pair of meshing gears rotatably supported in said case and having a running fit with the walls of such cavity whereby to draw fluid into such intake passage and deliver such fluid under pressure into such discharge passage, of a disk element in said case with a portion of one of its sides constituting a portion of one of the walls of such cavity closely adjacent one of the sides of said gears and with its other side exposed to fluid under pressure delivered by the pump, and means in said case abutting another portion of such first-named side of said element thereby constraining bodily movement of said element by fluid under pressure acting thereon in a direction closer toward such one side of said gears, said element being yieldable whereby the portion thereof unconstrained by said means is yieldably urged toward such one side of said gears, said element being of annular form including a small diameter portion and a large diameter portion, said case being formed with recesses receiving such portions of said element and with a passage leading from such discharge passage to the area of said element between such large and small diameter portions.

7. The combination with a gear pump comprising a case formed with a cavity therein and intake and discharge passages leading into such cavity, and a pair of meshing gears rotatably supported in said case and having a running fit with the walls of such cavity whereby to draw fluid into such intake passage and deliver such fluid under pressure into such discharge passage, of a disk element in said case with a portion of one of its sides constituting a portion of one of the walls of such cavity closely adjacent one of the sides of said gears and with its other side exposed to fluid under pressure delivered by the pump, and means in said case abutting another portion of such first-named side of said element thereby constraining bodily movement of said element by fluid under pressure acting thereon in a direction closer toward such one side of said gears, said element being yieldable whereby the portion thereof unconstrained by said means is yieldably urged toward such one side of said gears, said element being of annular form including a small diameter portion and a large diameter portion, said case being formed with recesses receiving such portions of said element with a passage leading from such discharge passage to the area of said element between such large and small diameter portions, and sealing rings encircling such large and small diameter portions of said element making sealing engagement with such recesses in said case.

JAMES P. JOHNSON.

References Cited in the file of this patent

UNITED STATES PATENTS

| Number | Name | Date |
| --- | --- | --- |
| 1,475,683 | Carrey | Nov. 27, 1923 |
| 1,771,863 | Schmidt | July 29, 1930 |
| 1,972,632 | Patton | Sept. 4, 1934 |
| 2,044,873 | Beust | June 23, 1936 |
| 2,105,259 | Oshei | Jan. 11, 1938 |
| 2,159,748 | Miller et al. | May 23, 1939 |
| 2,176,322 | Barrett | Oct. 17, 1939 |
| 2,211,154 | Oshei | Aug. 13, 1940 |
| 2,270,222 | Rea et al. | Jan. 13, 1942 |
| 2,336,294 | Rea | Dec. 7, 1943 |
| 2,444,165 | Lauck | June 29, 1948 |

FOREIGN PATENTS

| Number | Country | Date |
| --- | --- | --- |
| 135,834 | Great Britain | July 15, 1920 |